United States Patent
Huggett et al.

(10) Patent No.: US 7,075,264 B2
(45) Date of Patent: Jul. 11, 2006

(54) INSTANTANEOUS POWER FLOATING FRAME CONTROLLER

(75) Inventors: Colin Huggett, Longmont, CO (US);
Zheng Wang, Mississauga (CA);
George You Zhou, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/862,960

(22) Filed: Jun. 8, 2004

(65) Prior Publication Data
US 2005/0218862 A1 Oct. 6, 2005

Related U.S. Application Data

(60) Provisional application No. 60/557,710, filed on Mar. 31, 2004.

(51) Int. Cl.
*H02P 1/46* (2006.01)
*H02P 1/50* (2006.01)
*H02P 3/18* (2006.01)
*H02P 6/00* (2006.01)
*H02P 23/00* (2006.01)

(52) U.S. Cl. .................. 318/722; 318/700; 318/721; 318/363; 318/254

(58) Field of Classification Search ............... 318/700, 318/721, 722, 363, 254
See application file for complete search history.

(56) References Cited

U.S. PATENT DOCUMENTS

| | | | |
|---|---|---|---|
| 4,379,258 A | 4/1983 | Sugimoto | |
| 5,136,494 A | 8/1992 | Akagi et al. | |

(Continued)

FOREIGN PATENT DOCUMENTS

EP 1 133 050 A2 9/2001

(Continued)

OTHER PUBLICATIONS

"Speed Sensorless Field-Oriented Control Based on Phase Difference," Akio Hagiwara et al., Industrial Electronics Society, 1998. IECON'98. Proceedings of the 24th Annual Conference of the IEEE Aachen, Germany Aug. 31-Sep. 4, 1998, New York, NY, USA, IEEE, US, vol. 2, Aug. 31, 1998, pp. 1014-1017.

(Continued)

*Primary Examiner*—Rina Duda
*Assistant Examiner*—Erick Glass
(74) *Attorney, Agent, or Firm*—Birch, Stewart, Kolasch & Birch, LLP (57) ABSTRACT

The present invention relates to a method of controlling a power converter (20) of a synchronous machine system (10), the method comprising sampling phase-current values between the power converter (20) and the synchronous machine (30); selecting a reference frame; regulating a current vector to align with the selected reference frame, the selected reference frame having a direct-axis component and a quadrature-axis component; estimating rotor speed and position as a function of instantaneous power; adjusting the selected reference frame, based on estimated rotor position, to synchronize the selected reference frame with a magnetic axis of the rotor, thereby generating a synchronized floating frame; and applying the synchronized floating frame to control the power converter (20). The present invention also related to a power converter controlling apparatus (100) for controlling a power converter (20) of a synchronous machine system (10) without use of a machine position sensor.

22 Claims, 5 Drawing Sheets

U.S. PATENT DOCUMENTS

| | | | |
|---|---|---|---|
| 5,349,522 A | 9/1994 | Konishi et al. | |
| 5,373,223 A | 12/1994 | Akagi et al. | |
| 5,565,752 A * | 10/1996 | Jansen et al. | 318/807 |
| 5,701,066 A * | 12/1997 | Matsuura et al. | 318/808 |
| 5,877,606 A | 3/1999 | Nozari | |
| 5,877,607 A * | 3/1999 | Masaki et al. | 318/807 |
| 6,301,136 B1 * | 10/2001 | Huggett et al. | 363/95 |
| 6,362,590 B1 | 3/2002 | Nozari | |
| 6,501,243 B1 * | 12/2002 | Kaneko et al. | 318/700 |
| 2002/0117990 A1 * | 8/2002 | Sawada et al. | 318/727 |

FOREIGN PATENT DOCUMENTS

WO     WO-03/084049 A1     10/2003

OTHER PUBLICATIONS

"Two-degree-of-freedom Control of a PMSM Drive without Mechanical Sensor," K. S. Low et al., Proceedings of the 24th Annual Conference of the IEEE Industrial Electronics Society. Aachen, Aug. 31-Sep. 4, 1998, Annual Conference of the IEEE Industrial Electronic Society, New York, NY : IEEE, US, vol. 1, Aug. 31, 1998, pp. 498-502.

* cited by examiner

INSTANTANEOUS POWER FLOATING FRAME CONTROLLER

RELATED APPLICATION

This application claims priority under 35 USC §119(e) of Provisional Application No. 60/557,710 filed Mar. 31, 2004, the entire contents of which are herein incorporated by reference.

FIELD OF THE INVENTION

The present invention relates to electrical power conversion, and more particularly to a controller for a power converter, such as an inverter of a synchronous AC motor drive system.

BACKGROUND OF THE INVENTION

A synchronous AC motor typically utilizes rotor position sensors to provide information regarding the position of the motor's rotor with respect to the motor's stator windings. Such positional information allows for proper conversion of power that is supplied to the stator windings. Rotor position sensors such as Hall effected devices are typically mounted in the stator, proximate the stator winding, to provide intelligence regarding rotor position. Such rotor position sensors, however, can be unreliable due to mechanism alignment problems and temperature incompatibility problems between the stator windings and electronic components such as the Hall effect devices. Moreover, the rotor position sensors can be difficult to mount to the motor during motor assembly, especially for multi-pole motors. In multi-pole motors, the electrical misalignment angle is equivalent to the angular mechanical misalignment angle multiplied by the number of pole pairs.

Due these and other drawbacks, sensorless techniques have been developed to determine rotor position. One sensorless rotor position detection technique observes back EMF voltages at the stator windings. Another technique, which applies a floating frame control (FFC) scheme, has been described by Huggett et al. in U.S. Pat. No. 6,301,136, which in hereby incorporated herein by reference in its entirety. In the FFC scheme, motor phase-current is detected directly and used to estimate rotor speed/position, and also to control the reactive current to zero. More specifically, sensorless rotor speed/position detection is combined with current control to achieve a closed-loop equilibrium condition in which an inverter voltage vector ($V_{\omega t}$) finds a position that results in a zero direct-axis current component value. Under this condition, a reference frame (floating frame) is synchronized with the magnetic axis of the rotor and can be used to control power conversion.

Such control results in unity power factor during steady state operation, which is an advantage for high power inverter design. Although the FFC scheme disclosed in U.S. Pat. No. 6,301,136 is effective in many applications and conditions, the speed/position estimation in the FCC scheme is embedded in the direct-axis current regulator, which makes the loop tuning sensitive in some applications.

SUMMARY OF THE INVENTION

The present invention relates to a method and apparatus for controlling a power converter of a synchronous machine system, without the use of dedicated rotor position sensors. In one aspect, the present invention is a power converter control method comprising: sampling phase-current values between the power converter and the synchronous machine; selecting a floating reference frame; regulating a current vector to align with the reference frame, the reference frame having a direct-axis component and a quadrature-axis component; estimating rotor speed and position as a function of instantaneous power; adjusting the selected reference frame, based on estimated rotor position, to synchronize the selected reference frame with the magnetic axis of the rotor, thereby generating a synchronized floating frame; and applying the synchronized floating frame to control the power converter.

In another aspect, the present invention is a power converter controlling apparatus for controlling a power converter of a synchronous machine system, the controlling apparatus comprising a current controller for generating power converter command signals by: sampling phase-current values between the power converter and the synchronous machine; selecting a reference frame; regulating a current vector to align with the reference frame, the reference frame having a direct-axis component and a quadrature-axis component; adjusting the selected reference frame, based on estimated rotor position, to synchronize the selected reference frame with the magnetic axis of the rotor, thereby generating a synchronized floating frame; and applying the synchronized floating frame to control the power converter. The controlling apparatus further comprises a rotor position estimator for generating the estimated rotor position as a function of instantaneous power.

DETAILED DESCRIPTION

Embodiments of the present invention are more specifically set forth in the following description, with reference to the appended drawings. In the following description and accompanying drawings like elements are denoted with similar reference numbers. Further, well-known elements and related explanations are omitted so as not to obscure the inventive concepts presented herein.

In accordance with aspects of the present invention, a FFC-based control apparatus measures multi-phase line current, calculates a reference frame that synchronizes with rotor position/speed based on vector control and sensorless rotor position/speed estimation. In accordance with an implementation of the present invention, instantaneous power, including imaginary power (O) and real power (P), is calculated to determine rotor position/speed. The synchronized reference frame is used to control a power converter.

The instantaneous power floating frame controller can drive a synchronous machine without the use of rotor position sensors.

Figure 1:
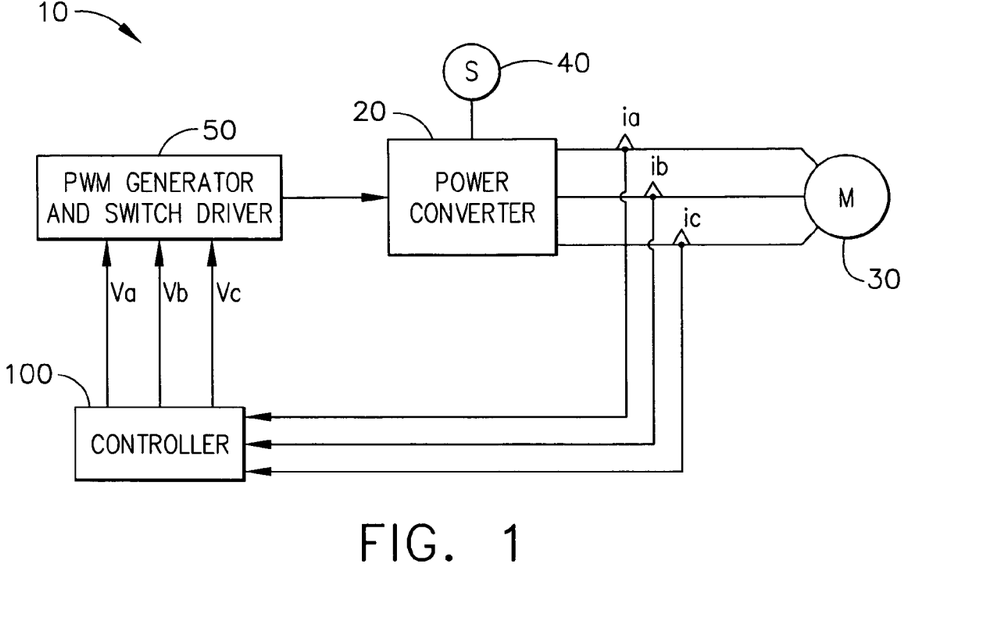
FIG. 1 illustrates a synchronous machine drive system to which principles of the present invention may be applied to control power conversion.

FIG. 1 illustrates a synchronous motor system 10 to which principles of the present invention may be applied to perform sensorless power converter control. The synchronous motor system 10 includes the following main components: a synchronous motor 30; a multi-phase power converter 20; a power source 40; a PWM (Pulse Width Modulation) Generator and switch driver 50; and a controller 100. The synchronous motor 30 may be a three-phase permanent magnet synchronous motor (PMSM), although principles of the present invention are not limited to such an environment. The power converter 20 may be an inverter for converting DC power from power source 40 into three-phase AC power, e.g., utilizing a configuration of insulated-gate bipolar transistors (IGBTs) under control of the PWM Generator and switch driver 50 (pulse width modulation (PWM) control). The controller 100 controls the power inverter 20 via the PWM Generator and switch driver 50 so that the power converter 20 outputs the desired multi-phase AC power to the stator windings of motor 30. Thus, during operation of the synchronous motor 30, the power converter 20 converts DC power from the power source 40 into multi-phase AC power and supplies such multi-phase AC power to stator windings of the motor 30, creating a rotating magnetic field that interacts with the rotor's magnetic field to create torque. Thus, proper control of the power converter 20, as a function of rotor position/speed, is necessary to generate a rotating magnetic field that results in efficient motor function, particularly for a variable speed drive system.

Figure 2:
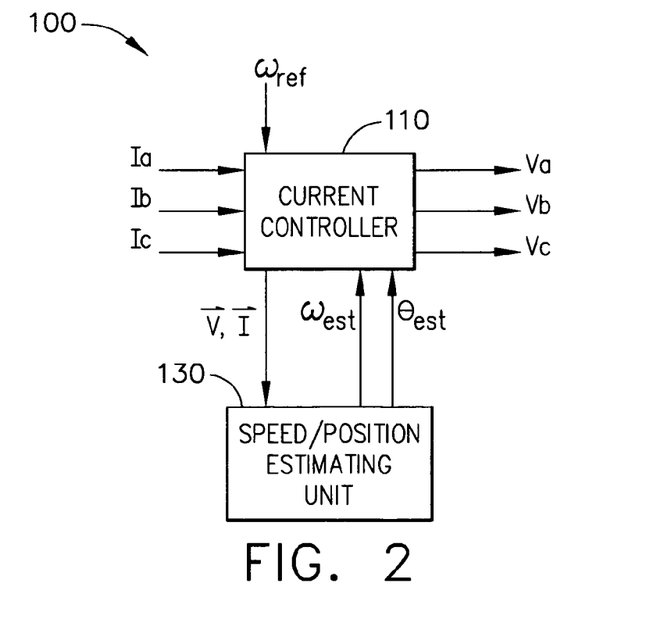
FIG. 2 is a general block diagram of a power conversion controller in accordance with an embodiment of the present invention.

FIG. 2 is a block diagram illustrating elements of the controller 100 according to an embodiment of the present invention. In the embodiment of FIG. 2, the controller 100 includes: a current controller 110 for producing voltage commands ($V_a$, $V_b$, and $V_c$); and a speed/position estimating unit 130 for generating a speed estimate $\omega_{est}$, and a position estimate $\theta_{est}$. Although the current controller 110 and the speed/position estimating unit 130 are shown as discrete elements, it should be recognized that this illustration is for ease of explanation and that the functions of these elements may be combined in the same physical element, e.g., in the same microcontroller or in one or more application-specific integrated circuits (ASIC).

Figure 3:
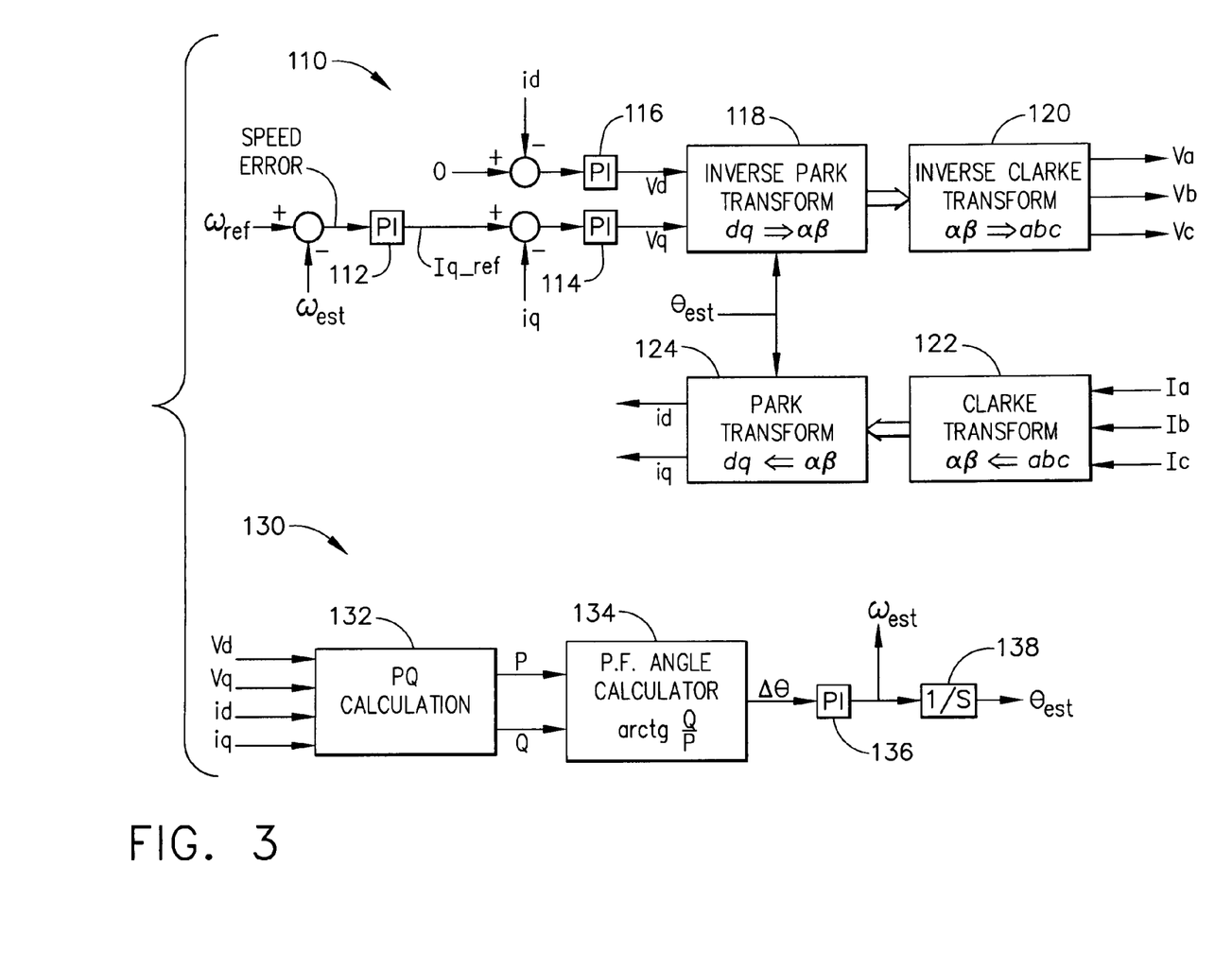
FIG. 3 is a block diagram illustrating, in greater detail, functional elements of the power conversion controller of FIG. 2 in accordance with an embodiment of the present invention.

FIG. 3 is a block diagram illustrating functional components of the current controller 110 and the speed/position estimating unit 130 in greater detail, in accordance with one embodiment of the present invention. In the embodiment illustrated in FIG. 3, the controller 110 includes a Clarke transform unit 122 for transforming multi-phase line current values $I_a$, $I_b$, $I_c$ into direct and quadrature components of a stationary stator frame $\alpha$, $\beta$; a Park transform unit 124 for calculating rotating reference frame quantities $I_q$ and $I_d$; a reactive current proportional integral (PI) controller 116 for generating a voltage reference $V_d$ as a function of $I_d$; an $I_q$ reference value generating PI controller 112, which generates a torque current reference based on the difference between a speed command $\omega_{ref}$ and estimated rotor speed $\omega_{est}$; a torque current PI controller 114 for generating a quadrature component voltage reference $V_q$ for torque control; an inverse Park transform unit 118 for transforming voltage references $V_d$ and $V_q$ into $\alpha\beta$ quantities; and an inverse Clarke transform unit 120 for transforming the $\alpha\beta$ quantities into three-phase voltage commands $V_a$, $V_b$, and $V_c$. It will be recognized that the configuration of the current controller 110 is consistent with a conventional arrangement for vector control of a PMSM.

The speed/position estimating unit 130 includes an instantaneous power calculation unit 132; a power factor angle calculator unit 134 for calculating the power factor angle; a speed estimating PI controller 136 for calculating estimated speed $\omega_{est}$ based on the power factor angle; and an integrator 138 for calculating position $\theta_{est}$ based on estimated speed $\omega_{est}$.

Both estimated speed $\omega_{est}$ and position $\theta_{est}$ are fed into the current controller 110, which performs vector control to generate voltage commands $V_a$, $V_b$, $V_c$. Operation of the current controller 110 and the speed/position estimating unit 130 will next be described with reference to the flow diagram of FIG. 4 and the vector diagrams of FIGS. 5A–5C.

Figure 4:
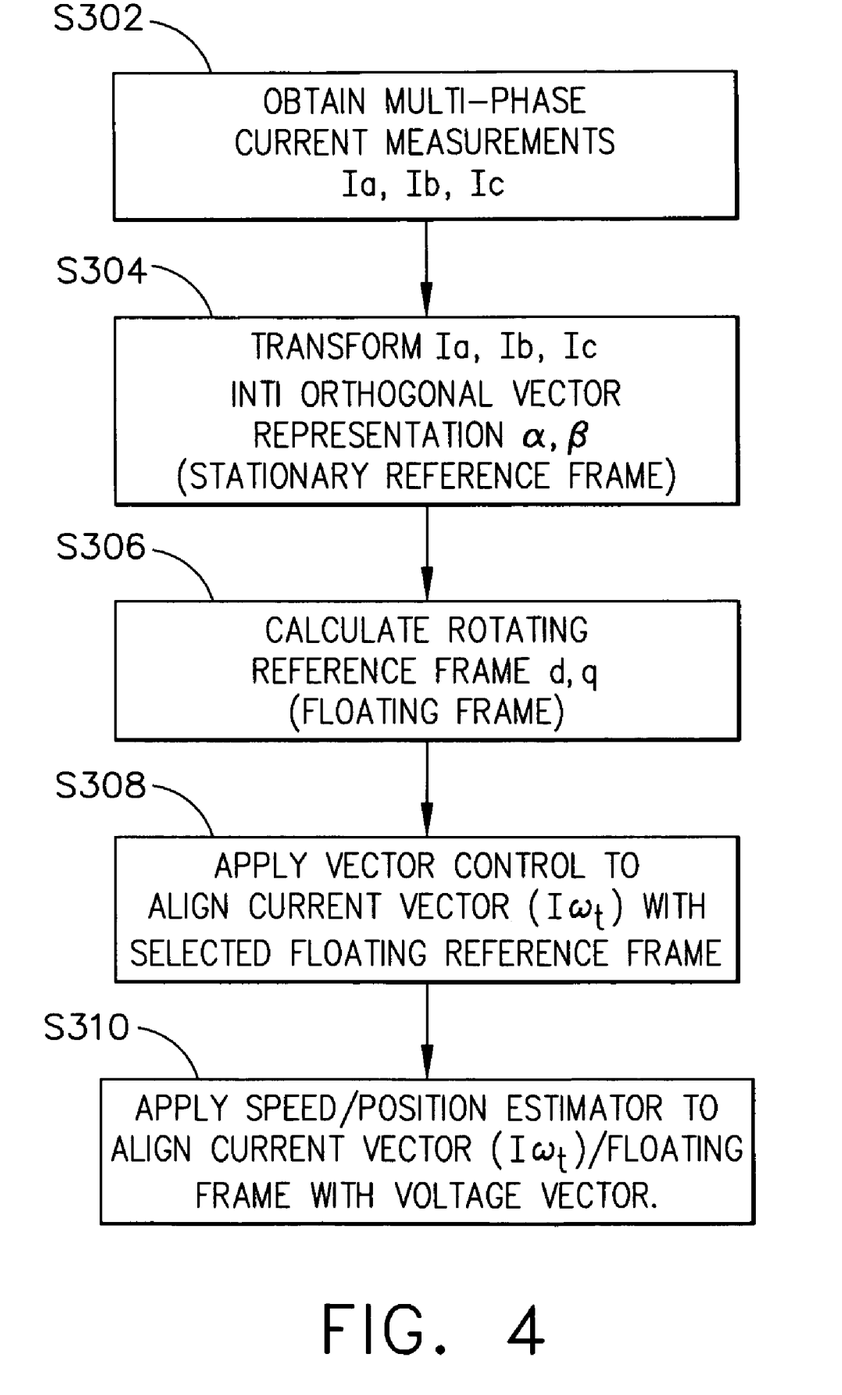
FIG. 4 is a flow diagram illustrating a floating frame synchronizing operation in accordance with an embodiment of the present invention.

Initially, multi-phase line current values $I_a$, $I_b$, and $I_c$ are obtained (step S302) and fed into the Clarke transform unit 122, which calculates stationary reference frame values $I_\alpha$, $I_\beta$ (step S304) by calculating:

$$I_\alpha = \frac{1}{3}(2I_a - I_b - I_c)$$

$$I_\beta = \frac{\sqrt{3}}{3}(I_b - I_c).$$

Next, the Park transform unit 124 calculates rotating reference frame values $I_d$ and $I_q$ (step S306) by calculating:

$$I_d = I_\alpha \cos\theta_{est} + I_\beta \sin\theta_{est}$$

$$I_q = -I_\alpha \sin\theta_{est} + I_\beta \cos\theta_{est}$$

Figure 5A:
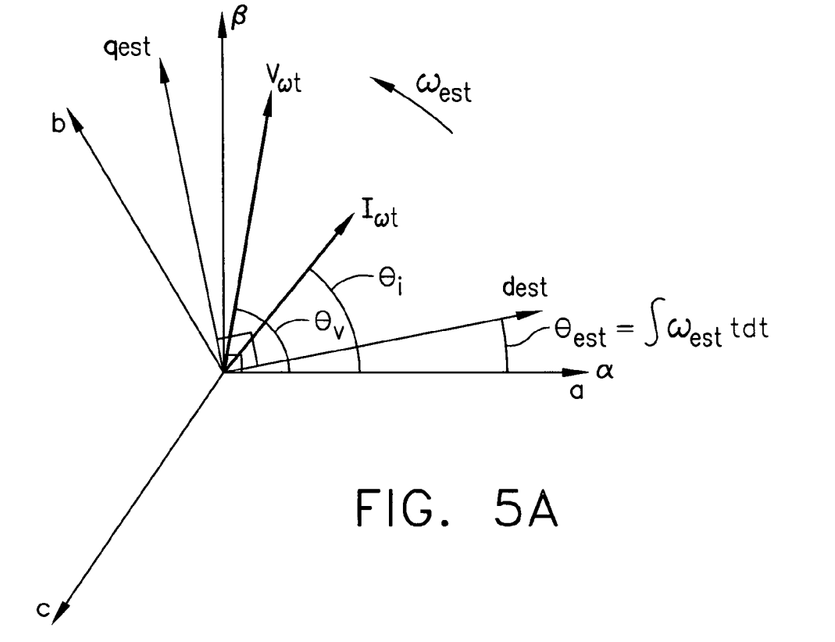
FIGS. 5A–5C are vector diagrams illustrating the concept of floating frame synchronizing in accordance with principles of the present invention.
Figure 5B:
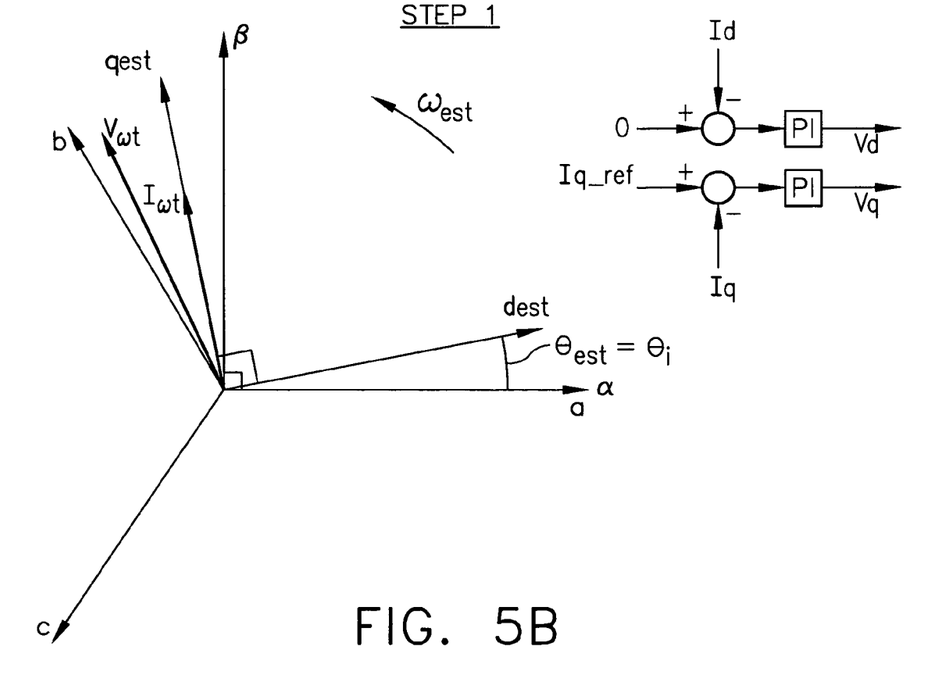
Figure 5C:
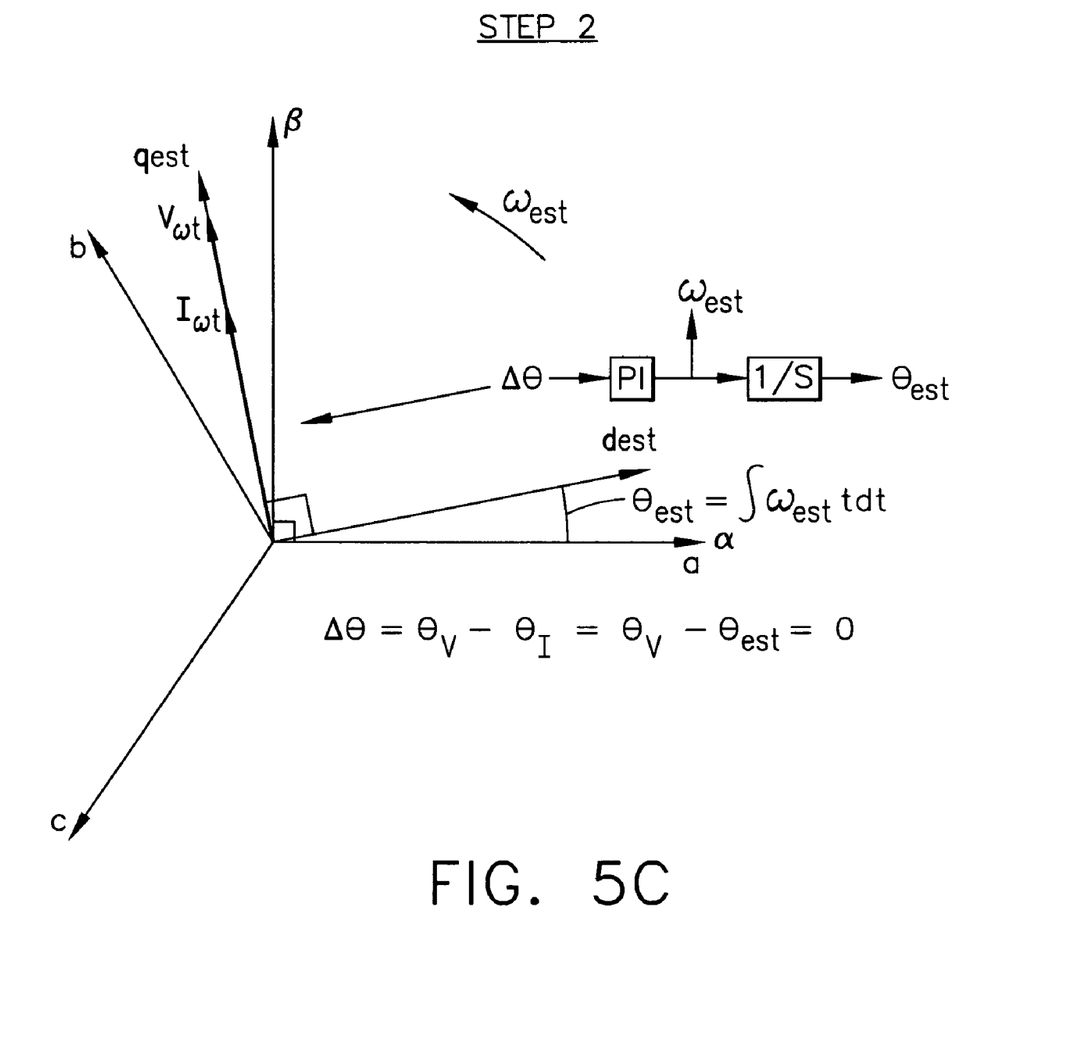

The stationary reference frame $\alpha$, $\beta$ and the selected rotating reference frame $q_{est}$ and $d_{est}$ can be seen in the vector diagrams 5A–5C. The difference between $I_d$ and a reference value (e.g., 0) is input to the reactive current PI controller 116 to generate a voltage reference $V_d$ to minimize such an error (i.e., closed-loop control). As is known in the art, vector control for controlling the reactive current $I_d$ to zero aligns the current vector $I_{\omega t}$ with the floating reference frame, as illustrated for example in FIG. 5B. The torque current PI controller 114 generates voltage reference $V_q$ as a function of the difference between $I_q$ and the $I_q$ reference ($I_{q\text{-}ref}$), which is based on the difference between a speed command value $\omega_{ref}$ and the estimated rotor speed $\omega_{est}$. The inverse Park transform unit 118 converts $V_d$ and $V_q$ into the stationary frame $V_\alpha$ and $V_\beta$ by calculating:

$$V_\alpha = V_d \cos\theta_{est} - V_q \sin\theta_{est}$$

$$V_\beta = V_d \sin\theta_{est} + V_q \cos\theta_{est}$$

The inverse Clarke transform unit 120 performs an inverse Clarke transform to generate command voltages $V_a$, $V_b$, and $V_c$.

$$V_a = V_\alpha$$

$$V_b = -\frac{1}{2}(V_\alpha - \sqrt{3}\, V_\beta)$$

$$V_c = -\frac{1}{2}(V_\alpha + \sqrt{3}\, V_\beta)$$

The instantaneous power calculator 132 of the speed/position estimating unit 130 calculates imaginary power (Q) and real power (P) by calculating:

$$P = V_q I_q + V_d I_d$$

$$Q = V_q I_d - V_d I_q$$

The power factor angle calculator 134 calculates the power factor angle by calculating:

$$\theta = Arctg(Q/P)$$

As seen for example in FIG. 5A, the power factor angle represents the angular difference between the voltage vector $V_{\omega t}$ and the current vector $I_{\omega t}$, which is minimized for proper alignment of the floating frame. The speed estimating PI controller 136 determines $\omega_{est}$ based on $\Delta\theta$, for example by applying a phase lock loop transfer function:

$$\omega_{est} = \frac{K_{PLL}T_{PLL}S + 1}{T_{PLL}S^2 + K_{PLL}T_{PLL}S + 1} \omega_V$$

where: $K_{PLL}$, $T_{PLL}$ are the gain and time constant of the speed estimator PI that has transfer function as $$K_{PLL}\left(1 + \frac{1}{T_{PLL}S}\right);$$

$\omega_v$ is voltage vector rotating speed; $\omega_r$ is rotor rotating speed, in steady state $\omega_v = \omega_r$.

As illustrated in FIG. 3, $\omega_{est}$ is used as the feedback of rotor speed for the vector control performed by the current controller 110. The integrator 138 determines $\theta_{est}$ by integrating $\omega_{est}$. The estimated rotor position angle $\theta_{est}$ is also fed back to the current controller 110.

As described above, an embodiment of the present invention applies a sensorless technique for determining rotor speed and position based on instantaneous power in a FFC scheme. As illustrated for example in FIGS. 5B and 5C, floating frame synchronization is achieved by first aligning the current vector $I_{\omega t}$ with a selected floating reference frame, which is achieved by applying vector control in the current controller 110 so that the reactive current $I_d$ is minimized (step S308). Next, the current vector $I_{\omega t}$/floating frame is aligned with the voltage vector $V_{\omega t}$ to achieve unity power factor (i.e., efficient floating frame control of the power converter 20) (step S310). As illustrated for example in FIG. 5C, the current vector $I_{\omega t}$ is aligned with the voltage vector $V_{\omega t}$ by minimizing the power factor angle $\Delta\theta$ in the speed/position estimating unit 130. By effectively de-coupling these two steps of achieving a floating reference frame that is synchronized with rotor speed/position, tuning of the controller 100 is simplified.

What is claimed is:

1. A method of controlling a power converter of a synchronous machine system, said method comprising:
   sampling phase-current values between said power converter and said synchronous machine;
   selecting a reference frame;
   regulating a current vector to align with the reference frame, said selected reference frame having a direct-axis component and a quadrature-axis component;
   estimating rotor speed and position as a function of instantaneous power, said step of estimating directly deriving rotor angle as a function of instantaneous power to estimate said rotor position;
   adjusting said selected reference frame, based on estimated rotor position, to synchronize said selected reference frame with a magnetic axis of said rotor, thereby generating a synchronized floating frame; and
   applying said synchronized floating frame to control said power converter.

2. The method according to claim 1, wherein said power converter is an inverter.

3. The method according to claim 1, wherein said synchronous machine is a permanent magnet synchronous motor.

4. The method according to claim 1, wherein said step of estimating rotor speed and position is based on an instantaneous power factor angle:

$$\theta = Arctg(Q/P),$$

where Q is imaginary power and P is real power.

5. The method according to claim 1, wherein instantaneous power is calculated as a function of a reference voltage vector and a feedback current vector.

6. The method according to claim 1, wherein said step of selecting a reference frame performs a Clarke transform on said phase-current values to calculate a stationary frame and performs a Park transform to generate direct-axis and quadrature-axis components in a rotating reference frame.

7. The method according to claim 1, wherein
   said step of applying said synchronized floating frame to control said power converter performs motor torque control.

8. The method according to claim 1, wherein
   said step of applying said synchronized floating frame to control said power converter performs magnetic flux control.

9. A method of controlling a power converter of a synchronous machine drive system, said method comprising:
   sampling phase-current values between said power converter and said synchronous machine;
   selecting a reference frame;
   regulating a current vector to align with the reference frame, said selected reference frame having a direct-axis component and a quadrature-axis component;
   estimating rotor speed and position as a function of instantaneous power;
   adjusting said selected reference frame, based on estimated rotor position, to synchronize said selected reference frame with a magnetic axis of said rotor, thereby generating a synchronized floating frame; and
   applying said synchronized floating frame to control said power converter, wherein
   said regulating step aligns said current vector with the selected reference frame, such that a direct-axis component of said current vector becomes zero; and
   said adjusting step aligns said selected reference frame and current vector with a voltage vector.

10. The method according to claim 9, wherein said selected reference frame and current vector are aligned to said voltage vector position by minimizing an imaginary power component of said instantaneous power.

11. The method according to claim 9, wherein said current vector is aligned with the selected reference frame by minimizing a reactive current component.

12. A power converter controlling apparatus for controlling a power converter of a synchronous machine drive system, said controlling apparatus comprising:
   a current controller for generating power converter command signals by:
      sampling phase-current values between said power converter and a synchronous machine;
      selecting a reference frame;

regulating a current vector to align with the reference frame, said selected reference frame having a direct-axis component and a quadrature-axis component;

adjusting said selected reference frame, based on estimated rotor position, to synchronize said selected reference frame with a magnetic axis of said rotor, thereby generating a synchronized floating frame; and applying said synchronized floating frame to control said power converter; and a rotor position estimator for generating said estimated rotor position as a function of instantaneous power, said rotor position estimator directly deriving rotor angle as a function of instantaneous power to estimate rotor position.

13. The controlling apparatus according to claim 12, wherein said power converter is an inverter.

14. The controlling apparatus according to claim 12, wherein said synchronous machine is a permanent magnet synchronous motor.

15. The controlling apparatus according to claim 12, wherein said rotor position estimator estimates rotor position based on an instantaneous power factor angle:

$\theta = \text{Arctg}(Q/P)$, where Q is imaginary power and P is real power.

16. The controlling apparatus according to claim 12, wherein said rotor position estimator calculates instantaneous power as a function of a reference voltage vector and a feedback current vector.

17. The controlling apparatus according to claim 12, wherein said current controller selects a reference frame by performing a Clarke transform on said phase-current values to calculate a stationary frame and performing a Park transform to generate direct-axis and quadrature-axis components in a rotating reference frame.

18. The controlling apparatus according to claim 12, wherein
said current controller applies said synchronized floating frame to achieve motor torque control.

19. The controlling apparatus according to claim 12, wherein
said current controller applies said synchronized floating frame to control magnetic flux.

20. A power converter controlling apparatus for controlling a power converter of a synchronous machine drive system, said controlling apparatus comprising:

a current controller for generating power converter command signals by:

sampling phase-current values between said power converter and a synchronous machine;

selecting a reference frame;

regulating a current vector to align with the reference frame, said selected reference frame having a direct-axis component and a quadrature-axis component;

adjusting said selected reference frame, based on estimated rotor position, to synchronize said selected reference frame with a magnetic axis of said rotor, thereby generating a synchronized floating frame; and applying said synchronized floating frame to control said power converter; and a rotor position estimator for generating said estimated rotor position as a function of instantaneous power, wherein said current controller regulates said current vector to align with the selected reference frame, such that said direct-axis component of said selected reference frame becomes zero, and aligns said selected reference frame and current vector with a voltage vector.

21. The controlling apparatus according to claim 20, wherein said current controller aligns said selected reference frame and said current vector with said voltage vector position by minimizing an imaginary power component of said instantaneous power.

22. The controlling apparatus according to claim 20, wherein said current controller aligns said current vector with the selected reference frame by minimizing a reactive current component.

* * * * *